US007831640B2

(12) United States Patent
Stephens et al.

(10) Patent No.: US 7,831,640 B2
(45) Date of Patent: *Nov. 9, 2010

(54) USING AN OVERFLOW LIST TO PROCESS MARK OVERFLOW

(75) Inventors: Maoni Z. Stephens, Sammamish, WA (US); Patrick H. Dussud, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 434 days.

This patent is subject to a terminal disclaimer.

(21) Appl. No.: 12/103,578

(22) Filed: Apr. 15, 2008

(65) Prior Publication Data

US 2009/0259702 A1    Oct. 15, 2009

(51) Int. Cl.
G06F 12/00    (2006.01)
G06F 9/45    (2006.01)
(52) U.S. Cl. ..................................... 707/816; 717/149
(58) Field of Classification Search ........................ None
See application file for complete search history.

(56) References Cited

U.S. PATENT DOCUMENTS

| 4,951,194 | A | 8/1990 | Bradley |
| 5,652,883 | A | 7/1997 | Adcock |
| 6,081,665 | A | 6/2000 | Nilsen |
| 6,314,436 | B1 | 11/2001 | Houldsworth |
| 6,526,422 | B1 | 2/2003 | Flood |
| 6,622,226 | B1 | 9/2003 | Dussud |
| 6,662,274 | B2 | 12/2003 | Subramoney et al. |
| 6,823,351 | B1 | 11/2004 | Flood et al. |
| 6,832,302 | B1 | 12/2004 | Fetzer |
| 7,181,585 | B2 | 2/2007 | Abrashkevich |
| 7,197,521 | B2 | 3/2007 | Subramoney et al. |
| 7,328,323 | B1 | 2/2008 | Conover |
| 2004/0128329 | A1 | 7/2004 | Ben-Yitzhak |
| 2006/0225135 | A1 | 10/2006 | Cheng |
| 2007/0022149 | A1 | 1/2007 | Bacon et al. |
| 2007/0083735 | A1 | 4/2007 | Glew |
| 2007/0162527 | A1 | 7/2007 | Wright et al. |
| 2007/0203960 | A1 | 8/2007 | Guo |
| 2007/0255909 | A1 | 11/2007 | Gschwind et al. |
| 2008/0052468 | A1 | 2/2008 | Speirs et al. |

OTHER PUBLICATIONS

David Detlefs , "Gargabe-Fisrt Garbage Collection", Aug. 9, 2004.*

(Continued)

*Primary Examiner*—Neveen Abel Jalil
*Assistant Examiner*—Tarek Chbouki
(74) *Attorney, Agent, or Firm*—Workman Nydegger

(57) ABSTRACT

Mark stack overflow list. A method may be practiced in a computing environment including application code that implements garbage collection functionality. The garbage collection functionality includes pushing object references onto a mark stack, such that objects referenced on the mark stack can be marked so as to prevent memory for the objects from being recycled for use with other objects instances. The method includes acts for handling overflows of a mark stack. The method includes accessing a reference to an object. The object is processed by attempting to enumerate references to other objects from the object onto a mark stack. An overflow condition of the mark stack is detected for a referenced other object. A reference to the referenced other object is placed on an overflow list. References from the overflow list are processed.

20 Claims, 2 Drawing Sheets

OTHER PUBLICATIONS

Philip Monson, "IBM Websphere Protal V6 Self Help Guide", Jan. 21, 2008.*
U.S. Appl. No. 12/128,305, filed May 28, 2008, Stephens.
Dybvig, R. Kent, et al., "Don't Stop the BIBOP: Flexible and Efficient Storage Management for Dynamically Typed Languages", Mar. 1994, 17 pages.
Hunt, Galen, et al., "An Overview of the Singularity Project", Oct. 2005, 44 pages.
Publib.Boulder.IBM.Com, "Detailed description of garbage collection", Based on information and belief available, at least as early as Dec. 4, 2007, 5 pages.
IBM Developer Kit and Runtime Environment, Java 2 Technology Edition, Version 1.4.1, Service Refresh 1, "IBM JVM Garbage Collection and Storage Allocation techniques", Nov. 2003, 59 pages.
www.lispwork.com, "8.6 Garbage collection strategy", LispWorks User Guide—Dec. 14, 2001, 1 page.

* cited by examiner

USING AN OVERFLOW LIST TO PROCESS MARK OVERFLOW

BACKGROUND AND RELEVANT ART

In computer systems, there is often a need to manage memory. In particular, when objects are no longer used, it is useful to recover memory that was allocated for use with the objects. Some systems in use today use explicit memory management whereby the systems use a command to allocate memory and a corresponding command to free memory. For example, the C programming language includes a command "malloc" that can be used to allocate memory for an object and a command "free" that can be used to free memory that has been previously allocated. However, this type of memory allocation and de-allocation suffers from a number of drawbacks. In particular, free memory may be scattered throughout a memory structure. Additionally, this type of allocation and de-allocation allows for malicious attacks that can be used to compromise data. For example, a hacker can cause memory that has been allocated by one thread to be de-allocated such that a malicious thread can change or access data stored in the memory.

To combat these drawbacks, a system has been created using automatic memory management where the system includes garbage collectors for identifying objects that are no longer being used. Memory for the objects no longer being used can be identified as free memory such that the memory can be used for the creation of new objects. Typical garbage collection involves marking objects that can be reached beginning at a reference by a root and reclaiming memory for any objects that are not marked by sweeping the heap. Marking can occur by setting (or clearing) a flag (such as a single bit) in the object. After sweeping the heap, all flags for the objects are cleared (or set) such that subsequent garbage collection can take place.

To perform marking activities, a root provides a reference to one or more in use objects. These objects are visited and marked. References from these objects to other objects are then followed to the other objects. The other objects are marked and their references to still other objects are followed until all of the in use objects have been marked.

To facilitate marking, a mark stack may be employed. The mark stack allows references at one object to other objects to be entered on the mark stack. When the mark stack is limited in size, the mark stack may overflow. For example, if an object is visited that has 12 references and the mark stack only has 10 free entries, an overflow is determined to have occurred and none of the references to the 12 referenced objects are placed on the mark stack.

Typically, when an overflow occurs, a heap including the objects is examined linearly by examining memory to determine if an object has been marked, and if it has been marked by following references in the object and marking the objects referenced by the references. While it may not be necessary to examine the entire heap as ranges of overflows can be implemented, as can be appreciated, this can nonetheless result in a time consuming and resource intensive marking process.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein includes a method that may be practiced in a computing environment including application code that implements garbage collection functionality. The garbage collection functionality includes pushing object references onto a mark stack, such that objects referenced on the mark stack can be marked so as to prevent memory for the objects from being recycled for use with other objects instances. The method includes acts for handling overflows of a mark stack. The method includes accessing a reference to an object. The object is processed by attempting to enumerate references to other objects from the object onto a mark stack. An overflow condition of the mark stack is detected for a referenced other object. A reference to the referenced other object is placed on an overflow list. References from the overflow list are processed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

As noted above, it can be very expensive to process overflowed objects during a garbage collector mark phase when all objects that fall in an overflow range have to be examined. When the number of objects that overflow is small, it can be more efficient to put them on a list so that they can be later processed without looking at all objects within an overflow range on the heap. If the number of overflowed objects is small enough to fit in the list, this list is used to process the mark overflow.

Figure 1:
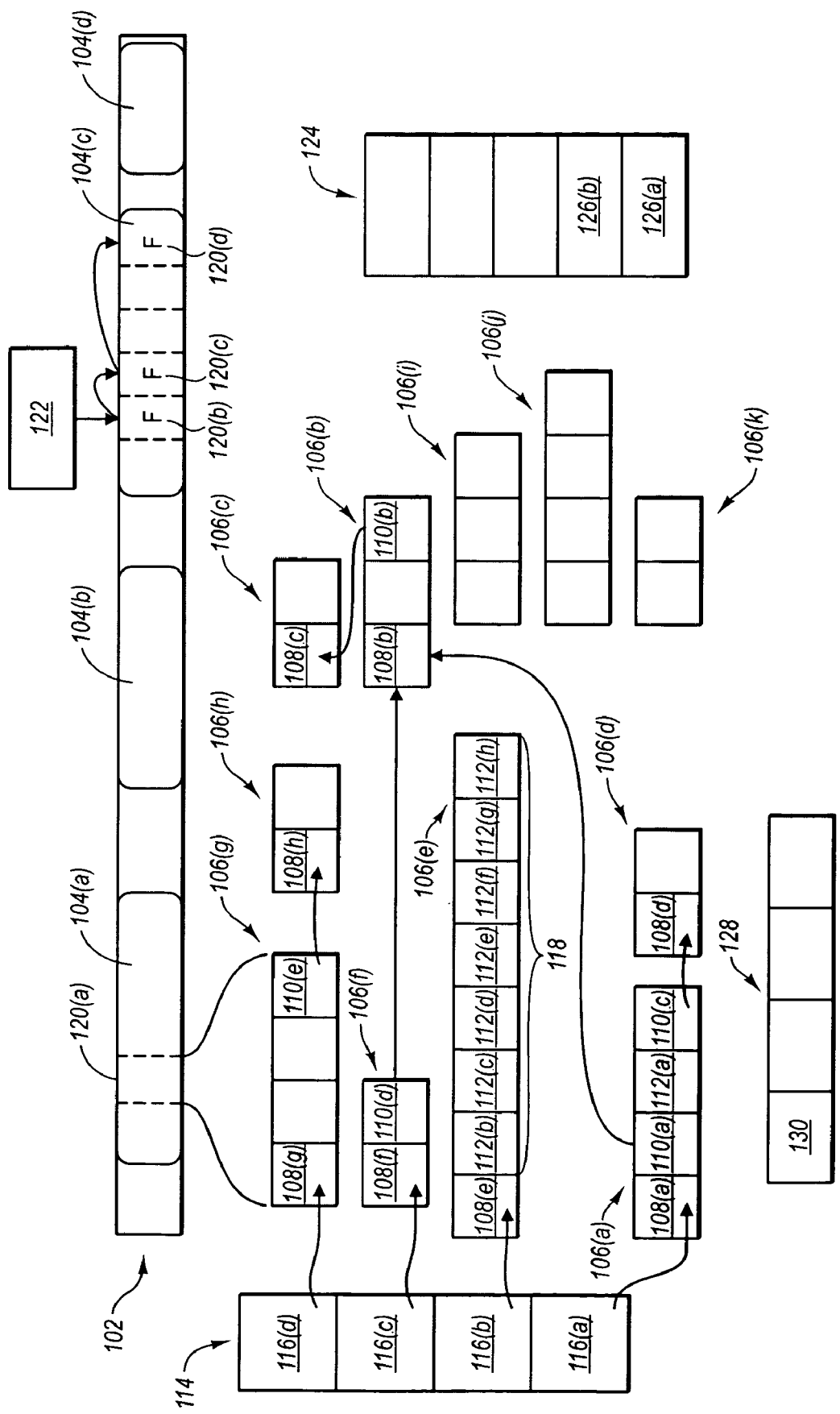
FIG. 1 illustrates various marking data structures including a mark stack overflow list.

Referring now to FIG. 1, examples of various garbage collection activities and allocation activities are illustrated. FIG. 1 illustrates a heap 102. The heap 102 comprises system memory, such as system RAM or other system memory that can be used to store objects. The heap 102 includes a number of segments 104. It should be noted that this point that references to designators in the Figures may be made generically or specifically when the Figures include more than one instance of an item illustrated. For example a generic reference may include a reference to segments 104 generically while a reference to a specific segment may include an additional designators appended to a reference such as is illustrated in FIG. 1 where the specific references to segments 104 include additional designators such that the specific references may be 104(a), 104(b), 104(c), and 104(d).

A segment 104 is a portion of the heap 102 that has been allocated by an operating system to store objects in memory spaces 120 for code running in the operating system environment. FIG. 1 further illustrates a number of objects 106 that may be stored in the segments 104.

An object 106 may include additional portions that vary from object to object. For example, an object 106 may include a header 108 that includes information about the object 106 including such information as class type, size, etc. The object 106 may include references 110 to other objects 106. Additionally an object 106 may include data members 112. Data members 112 may include raw low level data, such as integers, Booleans, floating point numbers, characters, and strings.

Illustrating now garbage collection marking and dead space reclaiming activities, FIG. 1 illustrates a root 114. The root 114 includes references to objects that are currently being used. Prior to mapping objects and object references, a snapshot of the state of a system may be taken to identify object states at a given time. The objects are then released so that other user threads can interact with the objects. Garbage collection activities are performed on the snapshot so as to allow the other activities to continue interaction with the objects. To perform garbage collection, a reference in a root entry may be followed to an object. For example, the root reference 116(a) points to an object 106(a). In the example illustrated, the object 106(a) can then be marked to indicate that the object 106(a) is currently in use. In one embodiment, marking an object 106 as being currently in use may include setting a bit or clearing a bit in the header 108 of an object 106. Thus, in the example illustrated, a bit set aside for the purpose of marking an object may be set in the header 108(a) of object 106(a) to mark the object 106(a).

Once an object 106 is accessed due to a reference by a root reference 116, then other references 110 in the object can be followed to mark other objects. For example, the reference 110(a) points to an object 106(b). Following the reference 110(a) allows the object 106(b) to be marked by setting a bit in the header 108(b) to indicate that the object 106(b) is currently in use. References 110 in the object 106(b) can be followed to find other objects 106 as well. For example, the object 106(b) includes a reference 110(b) that points to an object 106(c). Following the reference 110(b) to the object 106(c) allows the object 106(c) to be marked as being currently in use by setting a bit in the header 108(c).

Because the object 106(c) does not include references 110 to any other objects, Processing may then return to object 106(a) to follow the reference 110(c) to the object 106(d). Object 106(d) is then marked as being currently in use by setting a bit in the header 108(d). Because the object 106(d) does not include any references 110, processing can return to the root 114 to examine the root reference 116(b) which references an object 106(e). The object 106(e) can then be marked, by setting a bit in the header 108(d), as being currently in use. In this particular example, the object 106(e) includes an array 118 of data members 112(b)-112(h) such that the object 106(e) does not include any references 110 to other objects 106. Processing therefore returns to the root 114 to examine the root reference 116(c). The root reference 116(c) points to an object 106(f). The object 106(f) is marked by setting a bit in the header 108(f) to indicate that the object 106(f) is in use.

The object 106(f) includes a reference 110(d). The reference 110(d) points to an object 106(b). At this point, a determination is made that the object 106(b) has already been marked and thus processing on this particular chain such that processing is returned to the root 114. In particular, it should be noted that processing may include checking a mark bit in a header 108 before marking an object 106. Thus, objects 106 that have already been marked can be discovered so as to economize system resources when performing marking operations.

At the root 114, a root reference 116(d) is referenced which points to an object 106(g). The object 106(g) is marked by setting a bit in the header 108(g). The object 106(g) includes a reference 110(e) which points to an object 106(h). The object 106(h) is marked by setting a bit in the header 108(h).

At this point, because the root 114 includes no further root references 116, and all of the objects referenced by root references 116 or references 110 in other previously referenced objects 106 have been followed, an operation to reclaim dead space can be performed. It will be noted that FIG. 1 illustrates three objects object 106(i) object 106(j) and object 106(k) that have not been marked and are thus eligible to have their memory recovered for use for other objects. In one embodiment, this may be accomplished by marking dead space, such as memory space in segments 104 as free space. This is illustrated in segment 104(c) where memory spaces 120(b) 120(c) and 120(d) have been marked as free space.

While the example illustrated above has shown that objects 106 are traced and marked directly, marking may include the use of a mark stack 124. In particular, when an object 106 is reached due to following a reference, all of that objects references are placed on the mark stack 124 such that the mark stack 124 can be used to ensure that all of the appropriate mapping takes place.

For example, in the example illustrated in FIG. 1, following the root reference 116(a) to the object 106(a) results in references to the objects 106(b) and 106(d) referenced by 110(a) and 110(c) respectively being pushed onto the mark stack 124 as mark stack references in slots 126(b) and 126(a) respectively. The reference in slot 126(a) in the mark stack 124 to object 106(b) is then popped from the mark stack 124 to map to the object 106(b). When object 106(b) is mapped to, then a reference to object 106(c) is pushed to the mark stack 124 as reference in slot 126(a) due to the reference 10(b). The reference in slot 126(a) in the mark stack to object 106(c) is popped from the mark stack, where after it is determined that object 106(c) has no references. Thereafter, the reference in slot 126(a) to object 106(d) is popped from the mark stack 124 where it is determined that object 106(d) has no references. Because the mark stack 124 is empty at this point, processing continues at the root reference 116(b) in the same fashion described above. Additionally, processing may further continue with root references 116(c) and 116(d) until all of the in use objects have been marked.

As can be imagined, when the mark stack 124 is limited in size, or limited in the amount that the mark stack 124 can grow, overflows of the mark stack 124 can occur. For example, consider a case where a mark stack 124 has 10 free entries, but a reached object 106 has 12 references. This condition can be detected and an indicator that the mark stack has overflowed can be provided. When this occurs, some systems look at and mark objects directly in the heap 102 by linear examination of the heap 102. For example, a garbage collector thread may begin examining a segment 104. When an overflow condition occurs, an object is discovered by linear examination beginning at a segment 104. A determination is made as to whether or not the object is marked. If the object is marked, then the garbage collector traces through the references of the object. If the object is not marked, the garbage collector jumps past the object (by jumping memory the size of the object as indicated by an object size) to begin examining further portions of the segment 104.

One optimization that has been implemented is limiting the amount of the heap that needs to be linearly examined by specifying ranges where overflows have occurred. For example, an initial range may be specified where the range is defined as follows:

Min=MaxPointer

Max=0

This range specifies that the beginning of the range is a maximum memory address in the heap 102 and that the maximum of the range is 0. In other words, there are no addresses in the range.

Now assume that an overflow is detected for an objet that has a starting address of 0x1000. A calculation can be performed to increase the range according to the discovery of the overflowed object. In particular, the following algorithm is applied to the present range:

Min=min(Min, OverflowAddress)

Max=max(Max, OverflowAddress)

The algorithm causes the new Min (i.e. the minimum of the range for linear examination of the heap 102) to be the minimum of the present Min and the Address, which is the minimum of MaxPointer and the OverflowAddress (i.e. 0x1000), which is 0x1000. The algorithm causes the new Max (i.e. the maximum of the range for linear examination of the heap 102) to be the maximum of the present Max and the Address, which is the maximum of 0 and the OverflowAddress (i.e. 0x1000). Thus the new Max is 0x1000 and the new range is:

Min=0x1000

Max=0x1000

Assume now that another object causes an overflow, where the other object is located t address 0x3000. In this case, using the same algorithm illustrated above, the range is expanded to:

Min=0x1000

Max=0x3000

Linear examination of the heap includes linear examination of segment portions that fall within this range.

As noted, this linear examination of the heap may be time consuming and resource intensive. Thus, some embodiment described herein implement an overflow list that can be used in place of the range algorithm described above. Thus, instead of using the range algorithm described above, references to overflowed objects are placed in an overflow list 128. Objects referenced in the overflow list are handled in a fashion similar to items in the root 114. For example, as illustrated above, when the mark stack is emptied, reference may be made to a next root reference 116 or to an overflow list reference 130.

Figure 2:
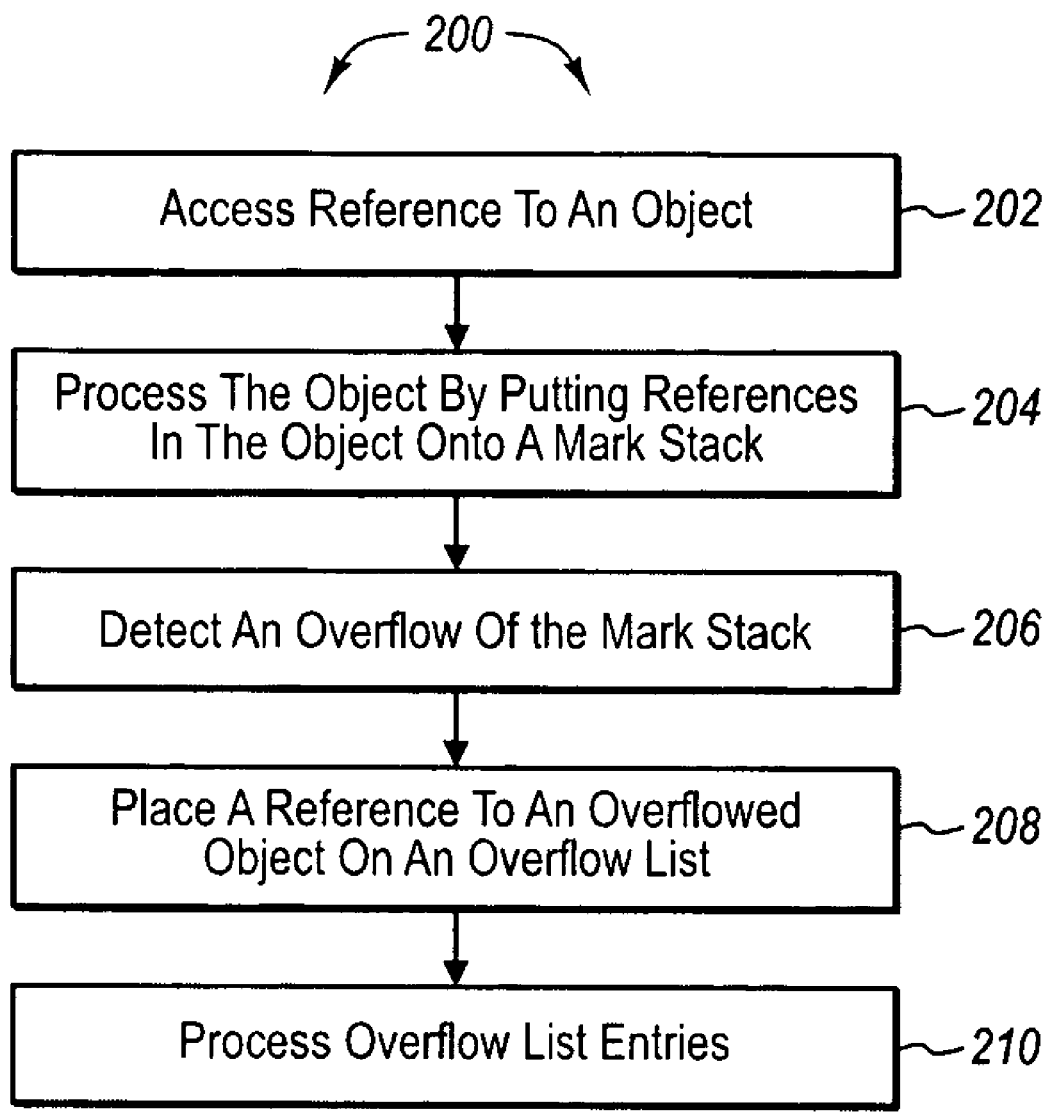
FIG. 2 illustrates a method of using a mark stack overflow list.

The following discussion now refers to a number of methods and method acts that may be performed. It should be noted, that although the method acts may be discussed in a certain order, no particular ordering is necessarily required unless specifically stated, or required because an act is dependent on another act being completed prior to the act being performed. Referring now to FIG. 2, a method 200 is illustrated illustrating a number of activities that may be performed.

One embodiment may be practiced in a computing environment including application code that implements garbage collection functionality. The garbage collection functionality includes pushing object references onto a mark stack, such that objects references on the mark stack can be marked so as to prevent memory for the objects from being recycled for use with other objects instances. The embodiment includes method acts for handling overflows of a mark stack. The method 200 includes accessing a reference to an object (act 202). For example, an object reference may be accessed from a root reference such as the root references 116 illustrated in FIG. 1.

The method 200 further includes processing the object by putting references in the object onto a mark stack (act 204). For example, in FIG. 1, if the reference to object 106(*a*) is referenced by reference to the root reference 116(*a*), then the object 106(*a*) can be processed by pushing references to objects 106(*b*) and 106(*d*) onto the mark stack 124 based on the object references 110(*a*) and 110(*c*).

The method 200 further includes detecting an overflow condition of the mark stack for a referenced other object (act 206). For example, and as described above, if while processing an object by attempting to enumerate references to other objects from the object onto a mark stack, it is discovered that the object has 12 references to other object, but the mark stack only includes 10 available reference slots, then an overflow condition is triggered. Attempting to enumerate references may include accessing references in an object to determine if the references should be enumerated in the mark stack. Embodiments are typically implemented such that none of the 12 references are added to the mark stack, but rather the method includes placing a reference to the referenced other object on an overflow list (act 208). For example, suppose that adding references from object 106(*a*) (i.e. adding object 106(*b*) and 106(*d*) to the mark stack 124) would cause the mark stack 124 to overflow; then a reference 130 to object 106(*a*) would be added to the overflow list 128 instead of attempting to add object 106(*a*)'s references to the mark stack 124.

The method 200 further includes processing overflow list entries (act 210). For example, the references 130 placed on the overflow list 128 may be processed. In some embodiments, the references 130 from the overflow list are processed after all references from a root are processed. For example, in FIG. 1, all of the root references 116(*a*)-116(*d*) are processed before any references 130 in the overflow list 128 are processed. The references in the overflow list 128 may be processed in a fashion similar to the references 116 in the root 114.

In some embodiments, the overflow list may reach a condition where the overflow list cannot accept any additional references. This may occur, for example, when the overflow list is full. As such, the method 200 may further include determining that the overflow list cannot accept any additional references, and as a result reverting to an alternative overflow handling algorithm. For example, the alternative overflow handling algorithm may include comprises processing an overflow range by linear examination of objects in a memory heap. As described above, a range, defined by minimums and maximums and that includes all overflowed objects may be analyzed linearly.

Garbage collection may be performed based on generational considerations. In particular, it has been discovered that objects that were more recently created tend become invalidated quicker, and that the longer an object exits, the longer it will likely exist. Thus, objects can be grouped by generation. Generation 0 includes objects created subsequent to a given garbage collection operation. Generation 1 includes object created before the given garbage collection operation but after a second given garbage collection operation. Generation 2 includes objects created prior the second given garbage collection operation.

Because it is likely that objects in generation 2 will continue to be valid, and that many objects in generation 1 will continue to be valid, garbage collection operations may be performed with generational considerations. For example garbage collection operations may be performed on only generation 0 objects or on only generations 0 and 1 objects. Often, garbage collection on generation 0 objects is performed more frequently than on generation 1 objects, which are preformed more frequently than on generation 2 objects. If garbage collection operations are performed on all objects (e.g. in this example generations 0, 1, and 2) then as used herein, they are performed without generational consideration.

Often, generation 0 objects will occur in the same segment 104 (see FIG. 1). This may be due to gathering of objects in the same generation, or due to the way in which segments 104 are allocated. As such, it may be more efficient to perform a linear examination of a segment 104 using a range rather than to implement the overflow list 128, as implementing the overflow list 128 may be computationally expensive and expensive in terms of storage resources used. Thus, it may be more efficient to use the overflow list 128 when garbage collection operations are being performed on all generations of objects. Thus, in some embodiments, the method 200 may be performed such that placing a reference to the referenced other object on an overflow list (act 208) is performed in response to determining that garbage collection is being performed without generational considerations.

In some embodiments, it may be useful to implement the overflow list 128 when generational considerations are made, but when older generations, such as generation 1 in the example above, are included in garbage collection operations. As such, the method 200 may performed such that placing a reference to the referenced other object on an overflow list (act 208) is performed in response to determining that garbage collection is being performed based on considerations for performing garbage collection on older generations of objects. In the example illustrated above, generations 1 and 2 are older than generation 0.

Embodiments herein may comprise a special purpose or general-purpose computer including various computer hardware, as discussed in greater detail below.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment including application code that implements garbage collection functionality, wherein the garbage collection functionality includes pushing object references onto a mark stack, such that objects referenced on the mark stack can be marked so as to prevent memory for the objects from being recycled for use with other objects instances, a method of handling overflows of a mark stack, the method comprising:

(a) accessing a reference to an object from either a root, a mark stack or from an overflow list;

(b) processing the object by attempting to enumerate references to other objects from the object onto the mark stack, the mark stack being configured to allow for marking of objects placed on the marked stack to prevent memory for the objects from being reclaimed for other objects;

(c) detecting an overflow condition of the mark stack for the referenced object, where the overflow condition exists if enumerating references from the referenced object to other objects would exceed remaining mark stack capacity;

(d) placing a reference to the referenced object on the overflow list;

(e) after placing the reference to the referenced object on the overflow list, processing objects in the mark stack; and (f) after processing all objects in the mark stack, thus clearing the mark stack, then processing references from the overflow list as recited in (b).

2. The method of claim 1, wherein accessing a reference to an object comprises receiving a reference to the object where the object is referenced by a root.

3. The method of claim 1, wherein accessing a reference to an object comprises accessing a reference to the object from the overflow list.

4. The method of claim 1, further comprising determining that the overflow list cannot accept any additional references, and as a result reverting to an alternative overflow handling algorithm.

5. The method of claim 4, wherein the alternative overflow handling algorithm comprises processing an overflow range by linear examination of objects in a memory heap.

6. The method of claim 4, wherein determining that the overflow list cannot accept any additional references comprises determining that the overflow list is full.

7. The method of claim 1, further comprising processing all objects referenced by roots prior to processing objects referenced in the overflow list.

8. The method of claim 1, wherein placing a reference to the referenced object on an overflow list is performed in response to determining that garbage collection is being performed without generational considerations.

9. The method of claim 1, wherein placing a reference to the referenced object on an overflow list is performed in response to determining that garbage collection is being performed based on considerations for performing garbage collection on older generations of objects.

10. In a computing environment including application code that implements garbage collection functionality, wherein the garbage collection functionality includes pushing object references onto a mark stack, such that objects references on the mark stack can be marked so as to prevent memory for the objects from being recycled for use with other objects instances, a physical computer readable medium comprising computer executable instructions that when executed by a processor cause the following to be performed:
  (a) accessing a reference to an object from either a root, a mark stack or from an overflow list;
  (b) processing the object by attempting to enumerate references to other objects from the object onto the mark stack, the mark stack being configured to allow for marking of objects placed on the marked stack to prevent memory for the objects from being reclaimed for other objects;
  (c) detecting an overflow condition of the mark stack for the referenced object, where the overflow condition exists if enumerating references from the referenced object to other objects would exceed remaining mark stack capacity;
  (d) determining that older generations of objects are included in garbage collection operations currently being performed;
  (d) determining that an overflow list is able to accept new entries;
  (e) as a result of detecting an overflow condition of the mark stack for the referenced object, determining that older generations of objects are included in garbage collection operations currently being performed, and determining that an overflow list is able to accept new entries, placing a reference to the referenced object on an overflow list;
  (f) after placing the reference to the referenced object on the overflow list, processing objects in the mark stack; and
  (f) after processing all objects in the mark stack, thus clearing the mark stack, then processing references from the overflow list as recited in (b).

11. The method of claim 10, wherein accessing a reference to an object comprises receiving a reference to the object where the object is referenced by a root.

12. The method of claim 10, wherein accessing a reference to an object comprises accessing a reference to the object from the overflow list.

13. The method of claim 10, further comprising determining that the overflow list cannot accept any additional references, and as a result reverting to an alternative overflow handling algorithm.

14. The method of claim 13, wherein the alternative overflow handling algorithm comprises processing an overflow range by linear examination of objects in a memory heap.

15. The method of claim 13, wherein determining that the overflow list cannot accept any additional references comprises determining that the overflow list is full.

16. The method of claim 10, further comprising processing all objects referenced by roots prior to referencing objects referenced in the overflow list.

17. A physical computer readable medium comprising computer executable instructions that when executed by a processor or configured to perform the following:
  (a) access a reference to an object from either a root, a mark stack or from an overflow list;
  (b) process the object by attempting to enumerate references to other objects from the object onto the mark stack, the mark stack being configured to allow for marking of objects placed on the marked stack to prevent memory for the objects from being reclaimed for other objects;
  (c) detect an overflow condition of the mark stack for the referenced object, where the overflow condition exists if enumerating references from the referenced object to other objects would exceed remaining mark stack capacity;
  (d) place a reference to the referenced object on the overflow list;
  (e) after placing the reference to the referenced object on the overflow list, process objects in the mark stack; and
  (f) after processing all objects in the mark stack, thus clearing the mark stack, then process references from the overflow list as recited in (b).

18. The method of claim 17, wherein placing a reference to the referenced other object on an overflow list is performed in response to determining that garbage collection is being performed without generational considerations.

19. The method of claim 17, wherein placing a reference to the referenced object on an overflow list is performed in response to determining that garbage collection is being performed based on considerations for performing garbage collection on older generations of objects 20. The method of claim 17, further comprising determining that the overflow list cannot accept any additional references, and as a result reverting to an alternative overflow handling algorithm.

* * * * *